(12) United States Patent
Rao et al.

(10) Patent No.: US 12,443,033 B2
(45) Date of Patent: Oct. 14, 2025

(54) ENHANCED AUGMENTED REALITY EXPERIENCE ON HEADS UP DISPLAY

(71) Applicant: Harman International Industries, Incorporated, Stamford, CT (US)

(72) Inventors: Rashmi Rao, West Bloomfield, MI (US); Benjamin Edward Lewis, Livonia, MI (US); Andrew Descisciolo, Farmington Hills, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 824 days.

(21) Appl. No.: 17/050,383

(22) PCT Filed: Mar. 27, 2019

(86) PCT No.: PCT/US2019/020617
§ 371 (c)(1),
(2) Date: Oct. 23, 2020

(87) PCT Pub. No.: WO2019/212634
PCT Pub. Date: Nov. 7, 2019

(65) Prior Publication Data
US 2021/0070176 A1 Mar. 11, 2021

Related U.S. Application Data
(60) Provisional application No. 62/667,355, filed on May 4, 2018.

(51) Int. Cl.
*G02B 27/01* (2006.01)
*B60K 35/10* (2024.01)
(Continued)

(52) U.S. Cl.
CPC .......... *G02B 27/0101* (2013.01); *B60K 35/10* (2024.01); *B60K 35/22* (2024.01);
(Continued)

(58) Field of Classification Search
CPC ............ B60K 35/00; B60K 2370/1529; B60K 2370/177; B60K 2370/741;
(Continued)

(56) References Cited

U.S. PATENT DOCUMENTS 7,864,419 B2    1/2011  Cossairt et al.
11,977,243 B1*  5/2024  Szczerba ................. G06F 3/167
(Continued)

FOREIGN PATENT DOCUMENTS

CN        1894976 A      1/2007
CN        104865702 A    8/2015
(Continued)

OTHER PUBLICATIONS

AZO Sensors, "UV/IR Detectors for Flame Detection—Principles of Operation" (2018). (Year: 2018).*
(Continued)

*Primary Examiner* — Aniss Chad
*Assistant Examiner* — Stephanie T Su
(74) *Attorney, Agent, or Firm* — McCoy Russell LLP

(57) ABSTRACT

Embodiments are disclosed for display configurations for providing an augmented reality heads up display. In one example, a method of operating a display system includes adjusting an output of image light from a display to pass through an optical element positioned between the display and at least one micro lens array, including impinging light upon a transparent plane to generate a three-dimensional image on a continuous plane that is based on a user focal point determined by an eye-tracking module.

20 Claims, 11 Drawing Sheets

(51) Int. Cl.

| | |
|---|---|
| *B60K 35/22* | (2024.01) |
| *B60K 35/234* | (2024.01) |
| *B60K 35/235* | (2024.01) |
| *B60K 35/28* | (2024.01) |
| *B60K 35/53* | (2024.01) |
| *B60K 35/60* | (2024.01) |
| *B60K 35/81* | (2024.01) |
| *G02B 7/04* | (2021.01) |
| *G02B 26/08* | (2006.01) |
| *G02B 27/00* | (2006.01) |
| *G02B 30/29* | (2020.01) |
| *G06F 3/01* | (2006.01) |
| *G06F 3/14* | (2006.01) |
| *G06T 19/00* | (2011.01) |
| *G09G 3/3208* | (2016.01) |
| *G09G 3/34* | (2006.01) |
| *G09G 3/36* | (2006.01) |
| *G09G 5/38* | (2006.01) |
| *B60K 35/21* | (2024.01) |
| *B60K 35/40* | (2024.01) |
| *B60K 35/65* | (2024.01) |

(52) U.S. Cl.
CPC .......... *B60K 35/234* (2024.01); *B60K 35/235* (2024.01); *B60K 35/53* (2024.01); *B60K 35/81* (2024.01); *G02B 7/04* (2013.01); *G02B 26/0875* (2013.01); *G02B 27/0093* (2013.01); *G02B 27/0179* (2013.01); *G02B 30/29* (2020.01); *G06F 3/013* (2013.01); *G06F 3/1423* (2013.01); *G06T 19/006* (2013.01); *G09G 3/3208* (2013.01); *G09G 3/3426* (2013.01); *G09G 3/36* (2013.01); *G09G 5/38* (2013.01); *B60K 35/211* (2024.01); *B60K 35/28* (2024.01); *B60K 35/415* (2024.01); *B60K 35/60* (2024.01); *B60K 35/65* (2024.01); *B60K 2360/166* (2024.01); *B60K 2360/167* (2024.01); *B60K 2360/177* (2024.01); *B60K 2360/332* (2024.01); *B60K 2360/741* (2024.01); *B60K 2360/785* (2024.01); *G02B 2027/0118* (2013.01); *G02B 2027/0127* (2013.01); *G02B 2027/0134* (2013.01); *G02B 2027/0181* (2013.01); *G02B 2027/0183* (2013.01); *G02B 2027/0185* (2013.01); *G02B 2027/0187* (2013.01); *G09G 2354/00* (2013.01); *G09G 2360/144* (2013.01); *G09G 2380/10* (2013.01)

(58) Field of Classification Search
CPC .......... B60K 2370/785; G02B 27/0093; G02B 2027/0181; G02B 2027/0187; G06T 19/006
See application file for complete search history.

(56) References Cited

U.S. PATENT DOCUMENTS

| | | | |
|---|---|---|---|
| 2005/0052617 A1 | 3/2005 | Fujikawa et al. | |
| 2009/0005961 A1* | 1/2009 | Grabowski | G02B 27/01 701/532 |
| 2012/0200601 A1* | 8/2012 | Osterhout | G02B 27/017 345/633 |
| 2015/0367714 A1* | 12/2015 | Kim | B60J 3/04 296/97.2 |
| 2016/0280136 A1* | 9/2016 | Besson | B60R 1/31 |
| 2016/0297362 A1 | 10/2016 | Tijerina et al. | |
| 2018/0095284 A1 | 4/2018 | Welch et al. | |
| 2018/0372923 A1 | 12/2018 | Wijaya et al. | |
| 2019/0168586 A1* | 6/2019 | Paepcke | B60K 35/10 |
| 2021/0197669 A1* | 7/2021 | Jeong | B60K 35/211 |

FOREIGN PATENT DOCUMENTS

| | | |
|---|---|---|
| JP | H09304850 A | 11/1997 |
| JP | 2004302643 A | 10/2004 |
| JP | 2005049872 A | 2/2005 |
| JP | 2005091508 A | 4/2005 |
| JP | 2005130087 A | 5/2005 |
| JP | 2006106608 A | 4/2006 |
| JP | 2007272137 A | 10/2007 |
| JP | 2009294509 A | 12/2009 |
| JP | 2010067175 A | 3/2010 |
| JP | 2013026770 A | 2/2013 |
| JP | 2015162901 A | 9/2015 |
| JP | 2017009864 A | 1/2017 |
| JP | 2017175621 A | 9/2017 |
| KR | 20090017212 A | 2/2009 |
| KR | 101131983 B1 | 3/2012 |
| WO | 2010029717 A1 | 3/2010 |
| WO | 2016051586 A1 | 4/2016 |
| WO | 2017097382 A1 | 6/2017 |
| WO | 2017127832 A1 | 7/2017 |
| WO | 2018026247 A1 | 2/2018 |

OTHER PUBLICATIONS

Microsoft Computer Dictionary, "liquid crystal display," 2002 (Year: 2002).*
AZO Sensors, "UV/IR Detectors for Flame Detection—Principles of Operation" (Year: 2018).*
Japanese Patent Office, Office Action Issued in Application No. 2020-560821, Apr. 21, 2023, 17 pages.
ISA European Patent Office, International Search Report and Written Opinion Issued in Application No. PCT/US2019/020619, Jul. 3, 2019, WIPO, 17 pages.
ISA European Patent Office, International Search Report and Written Opinion Issued in Application No. PCT/US2019/020616, Jul. 26, 2019, WIPO, 19 pages.
ISA European Patent Office, International Search Report and Written Opinion Issued in Application No. PCT/US2019/020617, Aug. 7, 2019, WIPO, 17 pages.
Rao, R. et al., "Adjustable Three-Dimensional Augmented Reality Heads up Display," U.S. Appl. No. 17/050,381, filed Oct. 23, 2020, 40 pages.
Rao, R. et al., "Reconfigurable Optics for Multi-Plane Heads-Up Displays," U.S. Appl. No. 17/050,386, filed Oct. 23, 2020, 39 pages.
Rao, R. et al., "Reconfigurable Optics for Multi-Plane Heads-Up Displays," U.S. Appl. No. 17/050,391, filed Oct. 23, 2020, 39 pages.
International Bureau of WIPO, International Preliminary Report on Patentability Issued in Application No. PCT/US2019/020616, Nov. 10, 2020, WIPO, 13 pages.
International Bureau of WIPO, International Preliminary Report on Patentability Issued in Application No. PCT/US2019/020617, Nov. 10, 2020, WIPO, 11 pages.
International Bureau of WIPO, International Preliminary Report on Patentability Issued in Application No. PCT/US2019/020618, Nov. 10, 2020, WIPO, 11 pages.
International Bureau of WIPO, International Preliminary Report on Patentability Issued in Application No. PCT/US2019/020619, Nov. 10, 2020, WIPO, 11 pages.
State Intellectual Property Office of the People's Republic of China, Office Action and Search Report Issued in Application No. 201980030009.8, Mar. 29, 2024, 18 pages. (Submitted with Partial Translation).

* cited by examiner

ENHANCED AUGMENTED REALITY EXPERIENCE ON HEADS UP DISPLAY

CROSS REFERENCE TO RELATED APPLICATIONS

The present application is a U.S. National Phase of International Application No. PCT/US2019/020617, entitled "ENHANCED AUGMENTED REALITY EXPERIENCE ON HEADS UP DISPLAY", and filed on Mar. 27, 2019. International Application No. PCT/US2019/020617 claims priority to U.S. Provisional Application No. 62/667,355, entitled "MIRRORLESS HEADS UP DISPLAY", and filed on May 4, 2018. The entire contents of the above-identified application are hereby incorporated by reference for all purposes.

FIELD

The disclosure relates to augmented reality experiences provided by see-through display configurations including three-dimensional heads up displays.

BACKGROUND

Augmented reality systems may be used to insert virtual (e.g., computer-generated) objects into a field of view of a user in order to make the virtual objects appear to the user to be integrated into a real-world environment. For example, a see-through display device may both display virtual objects and allow light from a real-world environment to pass through to a viewer, such that the viewer sees the real-world environment and the virtual objects through the display device.

SUMMARY

See-through displays may be used in a variety of environments, including a vehicle heads-up display. Such heads-up displays often provide a two-dimensional display and/or augmented reality experience that overlays images in a projected space that occupies up to two planes (e.g., a near plane and a far plane). By constraining the experience to the two planes, the relationship between the augmented reality image and a real-world environment is limited, especially in a moving environment such as an environment of a vehicle with a heads-up display that is used during vehicle travel. The disclosure provides for a three-dimensional augmented reality display system that includes an optical element to split the left and right eye image for every pixel of the image and then, using eye tracking, ties the left and right eye image back to where a user's eyes are focused. In this way, the disclosure provides a dynamic way of changing the focal point of where the image is tied together to create a continuous plane wherever the user is focusing, create a stereoscopic image there, and then keep moving that stereoscopic image as the environment and/or user focal point moves. In this way, a projected image may no longer be limited to near- and far-field positions, but may be positioned anywhere (e.g., at any horizontal, vertical, and depth location) in a three-dimensional field of view of the user and continuously re-positioned as the environment and/or user focus moves. For example, while a projected image in other augmented reality systems may only be positioned at one of two depths (e.g., near- and far-field), a projected image generated by the disclosed system may be positioned at any depth in a range (e.g., appearing to be located anywhere from 5 meters to 75 meters away from a user, as one non-limiting example range).

Another consideration for see-through displays, such as heads-up displays in a vehicle, includes provisions for providing one or both of world-locked virtual images (e.g., images or portions of images that move with the environment) and viewer-locked (or vehicle-locked) virtual images (e.g., images or portions of images that appear to remain in a same location relative to a viewer even as the viewer/vehicle moves through the environment). The disclosure provides mechanisms for providing various combinations of the image locking features discussed above.

An example method for operating a display system to provide a three-dimensional augmented reality experience includes adjusting an output of image light from a display to pass through an optical element positioned between the display and at least one micro lens array, including impinging light upon a transparent plane to generate a three-dimensional image on a continuous plane that is based on a user focal point and/or an origin position of an eye gaze determined by an eye-tracking module.

The disclosure provides example display systems for providing the three-dimensional augmented reality experience described above. As one example, the disclosure provides for a three-dimensional augmented reality heads up display. The three-dimensional display may leverage optical gratings to create mirrorless imaging and/or projection. A parallaxial or lenticular element (e.g., film) may be included in the display configuration to generate auto-stereoscopic images. As discussed, the generated images may leverage eye-tracking capabilities to position the image in a continuous plane. Optical elements in the parallaxial or lenticular element may be overlapping, thereby allowing the use of a lower resolution source for original image generation, which provides a low cost, high efficiency (high transmission), and low power consumption display (relative to displays that do not utilize overlapping optical elements). The original image generator may utilize transmissive display technology (e.g., liquid crystal display, LCD) and/or micro element-based technology (e.g., digital light processing microelectromechanical system, DLP MEMS). Examples that utilize transmissive displays may include a backlighting element that includes a matrix of light-emitting diodes (LED), which increases the power efficiency of the display relative to other backlighting configurations. For example, the backlighting may utilize localized dimming technology to avoid powering backlights that are not used in generating a desired image. The backlight may include a matrix of mini light-emitting diodes (mini-LED) or micro-light-emitting diodes (micro-LED). A free-form LED may be embedded in silica to provide low profile and/or small packaging for the backlighting. A driver or other user's gaze may be tracked and used to drive portions of the display to intersect the gaze (or to react to input provided via the gaze).

In some examples of the above-described display, a three-dimensional elements, such as a parallaxial or lenticular lens element, included in the display configuration may be movable to dynamically change the three-dimensional depth perception. The mobility of the three-dimensional element may also allow the position of the optical element to be controlled when high sunload environments are detected in order to automatically reduce the sunload on the display. For example, infrared (IR) detection may be performed using photodiodes behind a cold mirror (e.g., in the display configuration) to actively detect sunload and control a large mirror and/or a lenticular/parallaxial element to move to provide a countermeasure to the sunload. An additional or alternative feature of a lenticular lens in one of the above-described display configurations includes a variable prescription feature. For example, a prescription of the lenticular lens may be adjusted (e.g., by changing a radius and/or orientation of a portion of the lenticular lens) to correct for and/or otherwise counteract field curvature of a far field.

In another example, one or more lens elements may have positions that are adjustable via user input. For example, one or more lenses in a display configuration may be adjusted in space based on user input to create comfort in viewing images generated by the display configuration. An adjustable zoom lens may be included in the display configuration and moved in physical space (e.g., responsive to user input) to change a depth of the image field seen in space.

The disclosure also provides for display configurations that provide multiple overlapping image planes in space (e.g., multiple two-dimensional overlapping image planes). In one example display, chromatic films may be used to provide dense spectral combining to create the multiple images. For example, the chromatic films may allow certain light to pass through while reflecting others, allowing for overlapping imagery in three-dimensional space. As another example, a display configuration may include lasers that create multiple holographic sheets to provide overlapping imagery. In another example, a display configuration may include multiple LCD displays to create multiple planes of images. For example, two LCD transmissive displays may be positioned to enable polarized light at specific angles to enable reflection at Brewster's angles. In such examples, an additional retardation film may be used in the display configuration to create multiple image planes. As still another example, multiple near and far plane projections may be provided using organic light-emitting diode (OLED) or optical coatings and projection technology. For example, a near plane may be provided via a transparent OLED as windshield glass or a photosensitive material embedded in the windshield glass, while a far plane may be provided using an LCD or MEMS-based projection. The above-described configuration may allow for multiple image planes without using high volume/high profile projection systems, and thus may have lower power consumption than the other projection systems. It is to be understood that any of the above features may be used in combination to provide an enhanced augmented reality experience on a heads-up display.

BRIEF DESCRIPTION OF THE DRAWINGS

The disclosure may be better understood from reading the following description of non-limiting embodiments, with reference to the attached drawings, wherein below.

DETAILED DESCRIPTION

The disclosure provides for display configurations that address the above-described issues that may arise in forming a heads up display in an environment such as a vehicle. For example, the disclosure describes a mirrorless three-dimensional display configuration that may decrease a packaging size relative to other display configurations. The disclosure also describes example configurations that utilize selectively dimmable backlighting for displays to decrease a power consumption relative to other display configurations. The disclosure also describes increasing a user experience (e.g., increasing user comfort by adjusting a depth of field of displayed images) relative to other display configurations by providing movable optical elements. Examples for using near and far plane projections are also described to better integrate a displayed image with a background environment relative to other display configurations. Adjustments to structural configurations of optical elements, such as adjustments to a prescription of a lenticular lens, are described in order to increase an image quality when images are displayed using a curved field (e.g., a curved windshield). The described features may be used in any combination to achieve a display configuration that addresses the particular complications that arise in a given environment.

Figure 1:
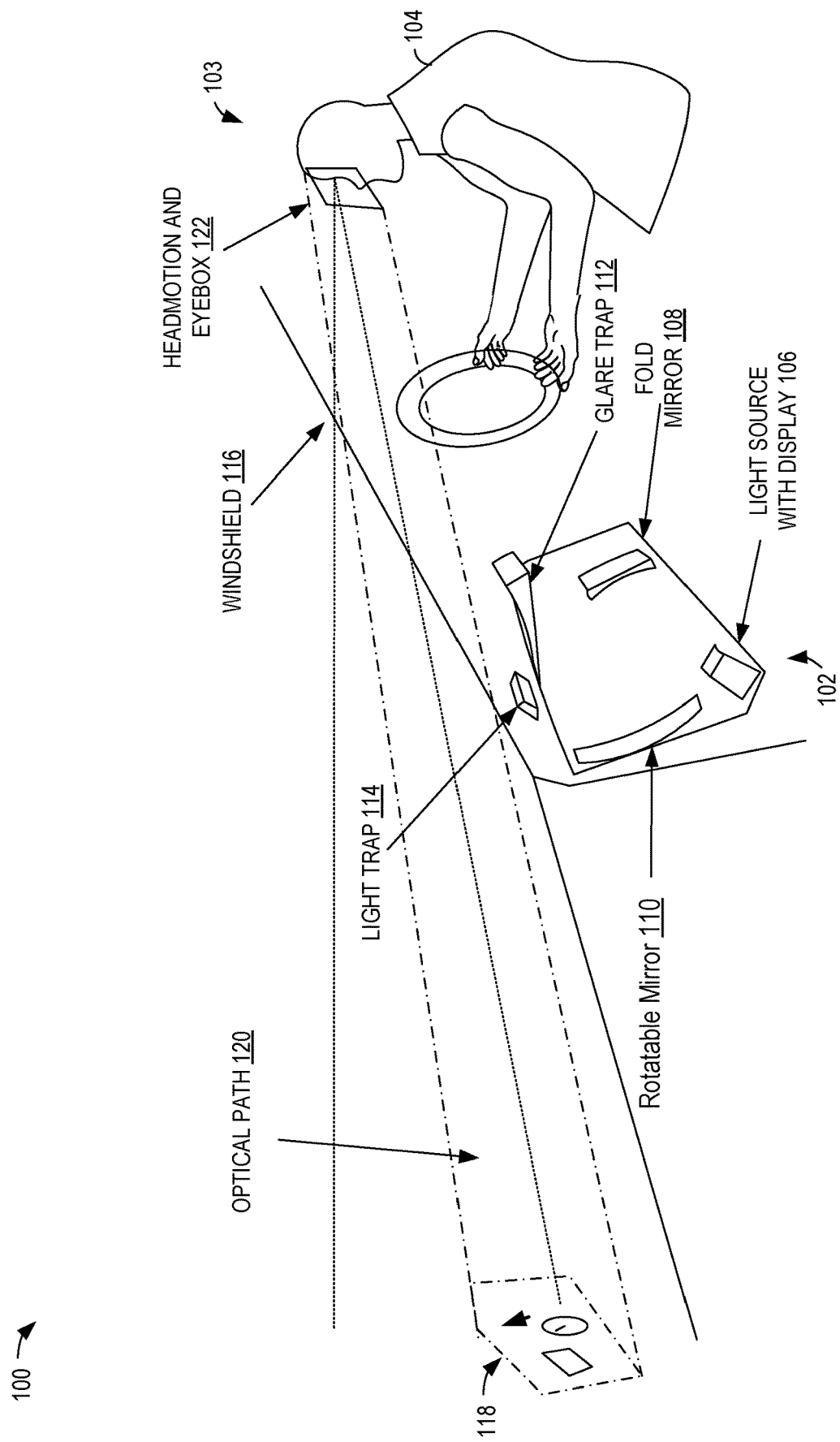
FIG. 1 shows an example augmented reality environment in accordance with one or more embodiments of the present disclosure.

FIG. 1 shows an example augmented reality environment 100, in which an in-vehicle display system 102 of a vehicle 103 is controlled to project virtual images into an environment of a user 104. The environment in the illustrated example is a vehicle, however it is to be understood that one or more of the below-described components may be included in a display configuration that is used in another augmented reality environment without departing from the scope of this disclosure.

The display system 102 includes a light source with display unit 106, which may project light in a controlled manner to form virtual images. The display unit 106 may project light toward a fold mirror 108, which may be planar or aspherical, and which reflects received light toward a rotatable mirror 110, which may be aspherical. The rotatable mirror may direct light toward a glare trap 112 and light trap 114, usable to control the light to appear in a position that is viewable through a windshield 116 to appear at a virtual location 118. The virtual location 118 may be controlled to be within an optical path 120 that originates from a head-motion and eyebox 122 of the user 104 and represents at least a portion of a viewable range of the user 104.

Figure 2A:
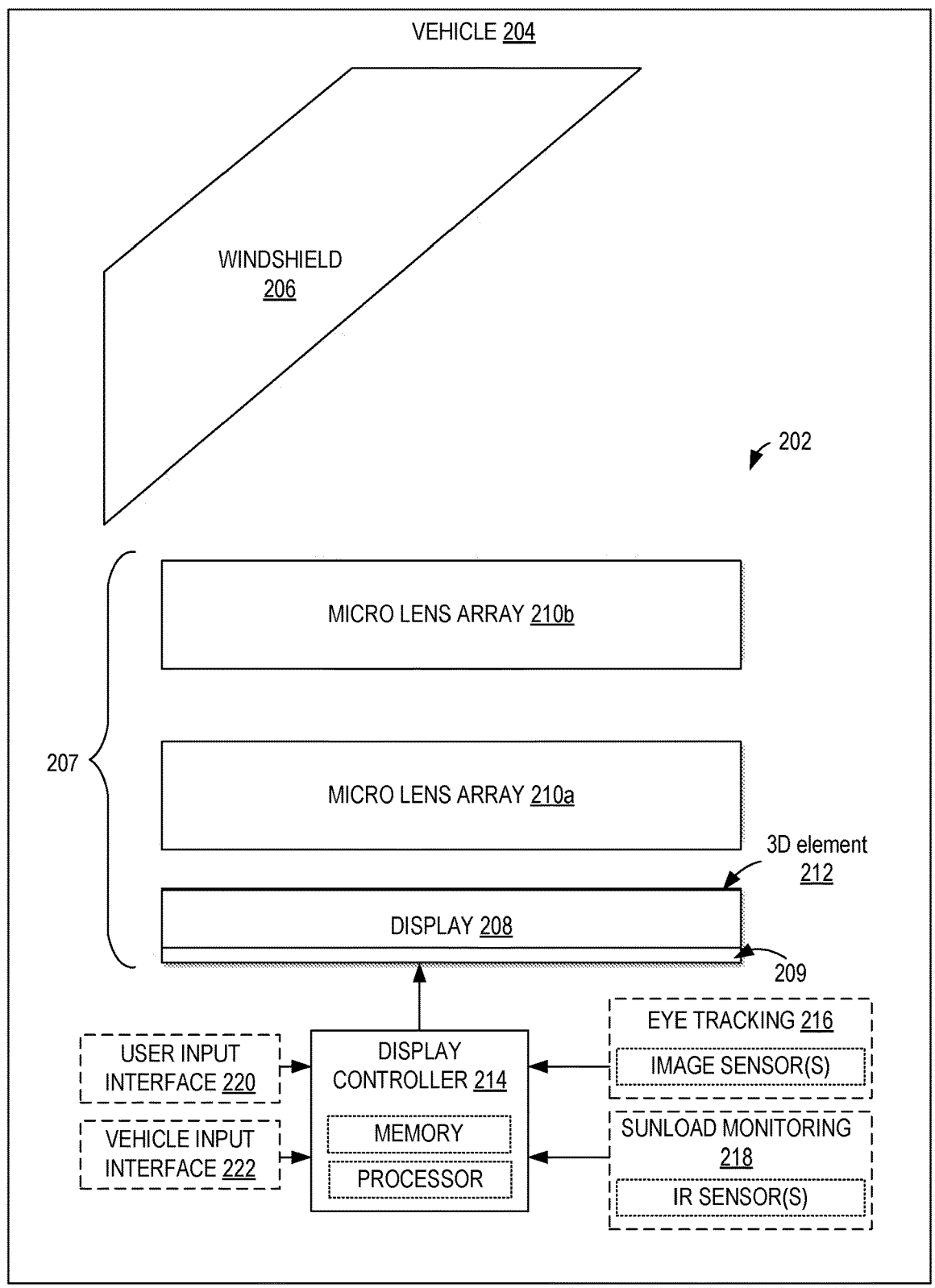
FIG. 2A shows an example block diagram of a mirrorless display configuration in accordance with one or more embodiments of the present disclosure.

As shown in FIG. 1, the use of mirrors in the display configuration causes the display system to occupy a large amount of space within the vehicle 103. FIG. 2A shows an example mirrorless three-dimensional display configuration 202 that may be used to decrease packaging size relative to mirrored display configurations. The display configuration 202 of FIG. 2A may be included inside a vehicle 204 and configured to project light onto and/or through a windshield 206. The display configuration may include a display 208, one or more micro lens arrays 210a and 210b, and a three-dimensional element 212 positioned between the display 208 and micro lens array 210a. The three-dimensional element 212 may include a parallaxial or lenticular element (e.g., film) that generates auto-stereoscopic images from the output of display 208. The display 208 may include transmissive display technology (e.g., a liquid crystal display, LCD) and/or micro element-based display technology (e.g., digital light processing microelectromechanical system, DLP MEMS). The micro lens array(s) may be positioned relative to the windshield 206 such that an entirety of the windshield or a selected portion of the windshield serves as a display surface (e.g., a transparent plane onto which three-dimensional display images are projected). In this way, the field of view of the display system may be sized according to the number and arrangement of micro lens arrays, which may provide for a display that has a larger field of view than other configurations (e.g., mirrored configurations). The display 208 may be illuminated via a backlight array 209, which includes a matrix of light sources (e.g., light-emitting diodes) distributed along a back of the display 208. As shown, the display 208, backlight 209, 3D element 212, and micro lens array(s) 210a and/or 210b may collectively form a display unit 207. Although shown separately, in some examples, display controller 214 may also be included in the display unit 207.

Figure 2B:
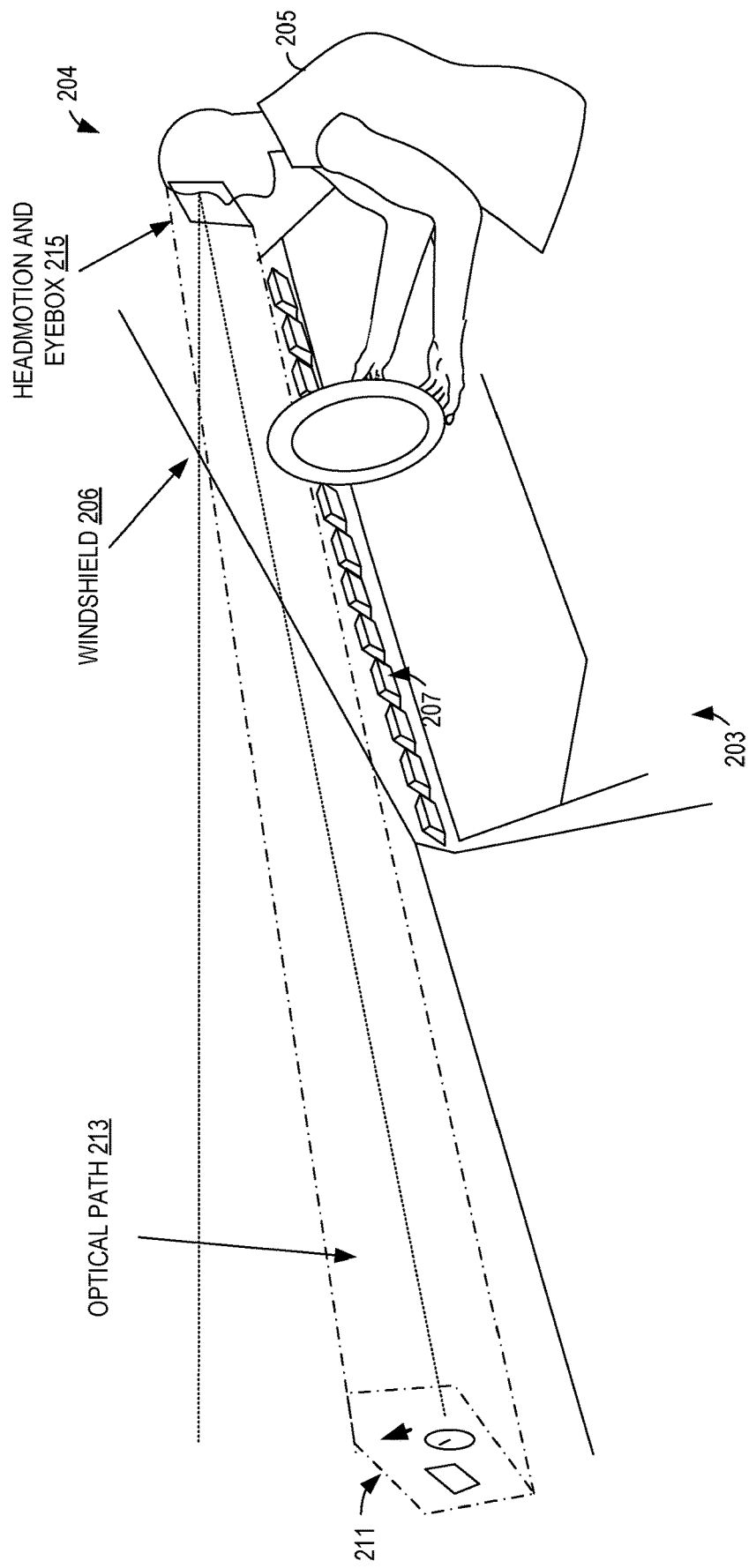
FIG. 2B shows an example schematic view of a mirrorless display configuration in a vehicle cabin in accordance with one or more embodiments of the present disclosure.

Turning briefly to FIG. 2B, a schematic representation of a cabin 203 of vehicle 204 is shown, in which a user 205 is seated. A plurality of display units 207 are distributed across the windshield 206 (e.g., to form an array of display units 207) to control image light to appear in a position that is viewable through the windshield 206 to appear at a virtual location 211. The virtual location 211 may be controlled to be within an optical path 213 that originates from a head-motion and eyebox 215 of the user 205 and represents at least a portion of a viewable range of the user 205. As described above with respect to FIG. 2A, each display unit 207 may include a display (e.g., display 208) with an array of backlights (e.g., backlight 209), one or more micro lens arrays (e.g., micro lens array 210a and/or 210b), and a 3D element (e.g., 3D element 212) positioned between the display and the micro lens array(s). Each display unit 207 may be controlled by an individual display controller (e.g., display controller 214) and/or a single display controller may control the display of each display unit 207.

Figure 2C:
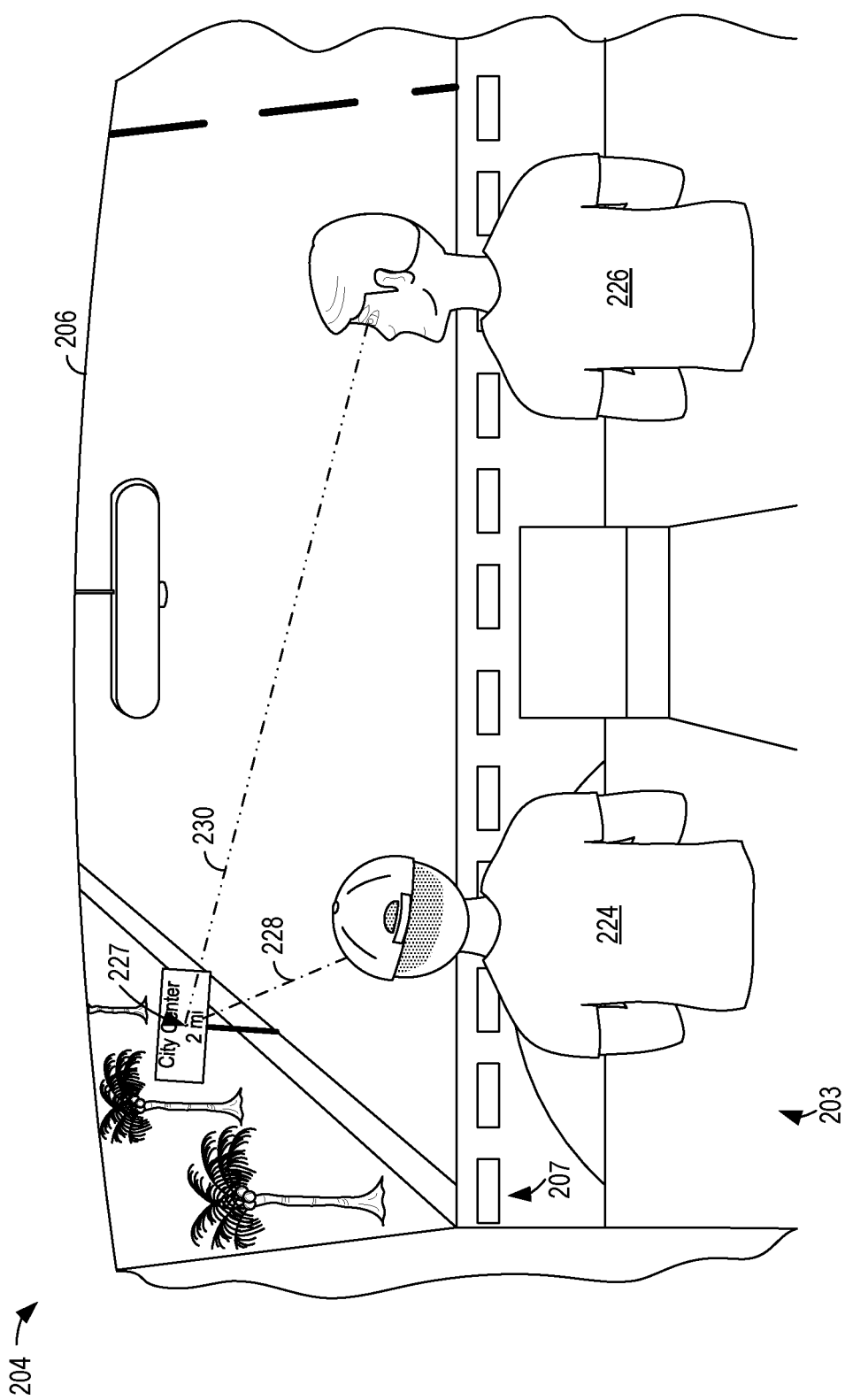
FIGS. 2C-2G show example schematic views of a mirrorless display configuration in a vehicle cabin for projecting images in accordance with one or more embodiments of the present disclosure.

FIGS. 2C-2G schematically show different display scenarios for displaying images on/through the windshield 206 via the display units 207. In FIG. 2C, a view on an interior of the cabin 203 of vehicle 204 is schematically shown from a different rear perspective relative to the cabin 203 as schematically shown in FIG. 2B. In the example of FIG. 2C, the cabin 203 includes two occupants, a first occupant 224 and a second occupant 226. Both occupants may have a user focal point 227 that targets the same object in an environment of the vehicle 204, however due to the different locations of the occupants (and different location of eyes of the occupants, which serve as an origin of the respective eye gaze paths of the occupants) in the cabin, first occupant 224 may have a first eye gaze path 228 that is different from a second eye gaze path 230 of the second occupant 226. Accordingly, the display units 207 may direct light onto the windshield differently to present an image viewable at the user focal point for the first occupant versus the second occupant.

Figure 2D:
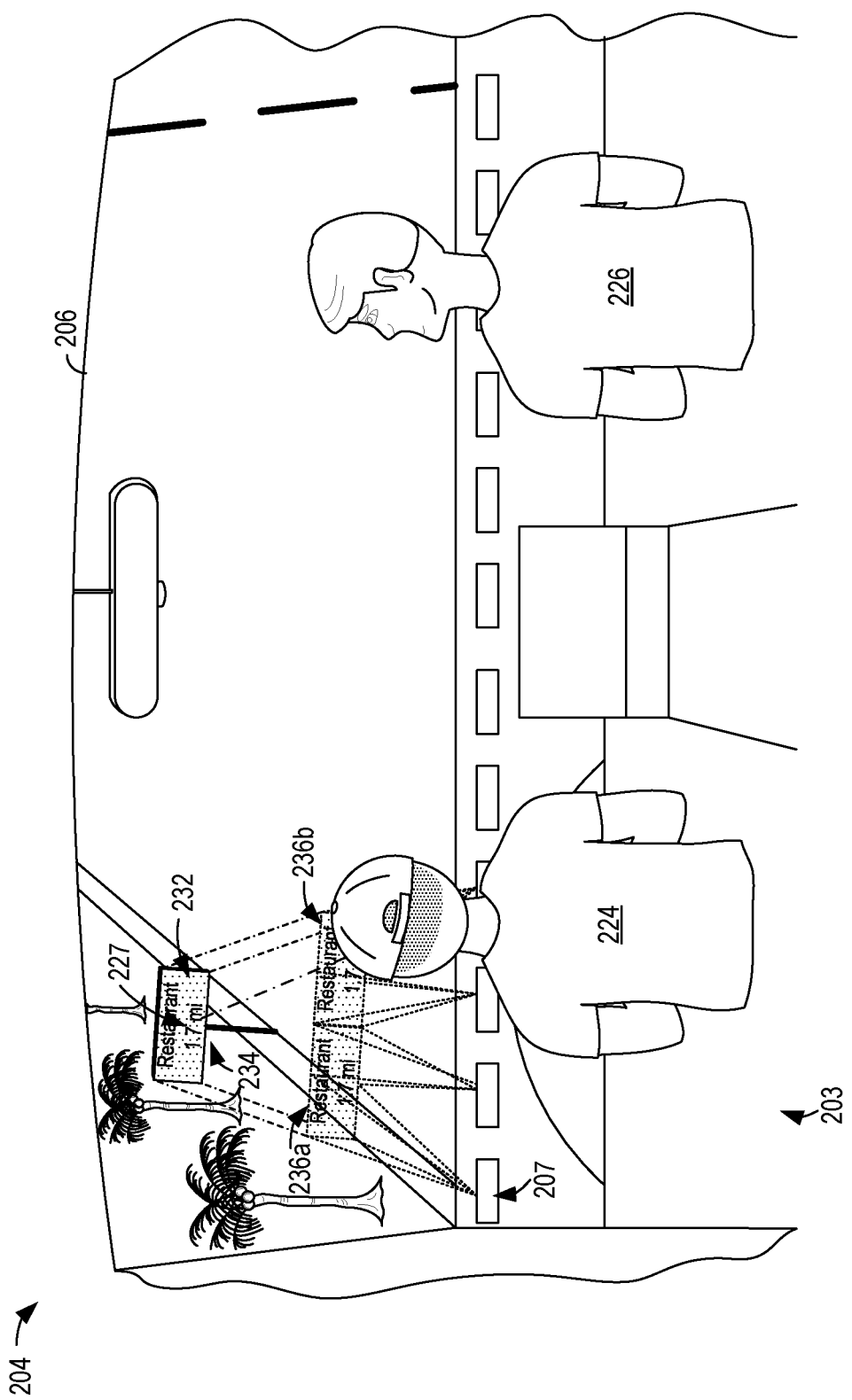
Figure 2E:
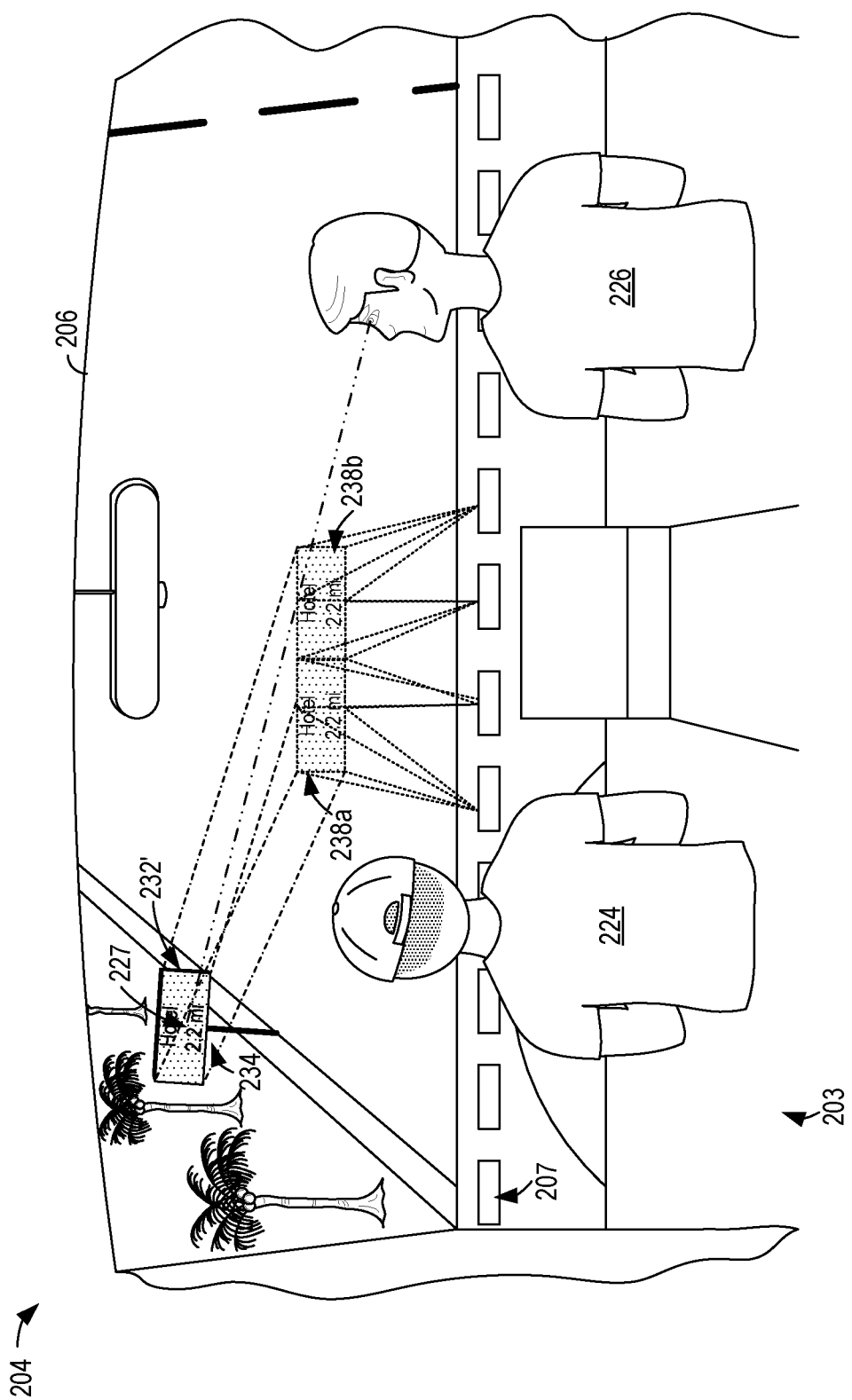

FIG. 2D shows an exemplary projection for overlaying a virtual image 232 on a real-world object, such as a sign 234 using stereoscopic images 236a and 236b. The stereoscopic images 236a and 236b are configured for presenting the virtual image 232 at the user focal point 227 from the perspective of the first occupant 224. In the illustrated example, such positioning is achieved through the coordinated use of the leftmost display units 207. FIG. 2E shows an exemplary projection for overlaying a virtual image 232' on the sign 234 using stereoscopic images 238a and 238b that are configured for presenting the virtual image 232' at the user focal point 227 from the perspective of the second occupant 226. The virtual images may be three-dimensional and customized for the occupants, and thus virtual image 232 may be different from virtual image 232'. For example, the second occupant 226 may be most interested in a distance to a hotel (e.g., based on a request for such information as received from the second occupant and/or based on an examination of recent activity or behaviors of the second occupant, such as a drowsiness level, that indicates an interest in a hotel), while the first occupant 224 may be most interested in a distance to a restaurant (e.g., based on a request for such information as received from the first occupant and/or based on an examination of recent activity or behaviors of the first occupant, such as a time since a last meal, that indicates an interest in a restaurant). Accordingly, the virtual image 232 may include information regarding a distance to a restaurant, while the virtual image 232' may include information regarding a distance to a hotel. Such information targeting may also be useful in taxi or ride share scenarios in which a destination for each occupant is known and related information for respective destinations is presented for each occupant.

Due to the differences in position of the two occupants, the stereoscopic images 238a/b are positioned in a different location than the stereoscopic images 236a/b. In the illustrated example, different display units 207 (e.g., middle display units) are used to project the stereoscopic images 236a/b relative to the units used to project the stereoscopic images 238a/b. In other examples, the same display units may be used to project either set of stereoscopic images, and a directionality of output light and/or other parameter (e.g., selective dimming of backlights for selected display units) may be adjusted to display the stereoscopic images in the different positions. In each example of FIGS. 2D and 2E, the stereoscopic images for the respective occupant are positioned based on the eye position and eye gaze of that respective occupant in order to ensure alignment of the virtual image from the perspective of the respective occupant. By positioning the virtual image based on a location of the eyes and eye gaze of a selected occupant, the projected images may accommodate any occupant of the vehicle, which may be useful in scenarios such as driverless vehicle scenarios in which an occupant may be seated anywhere in the vehicle.

Figure 2F:
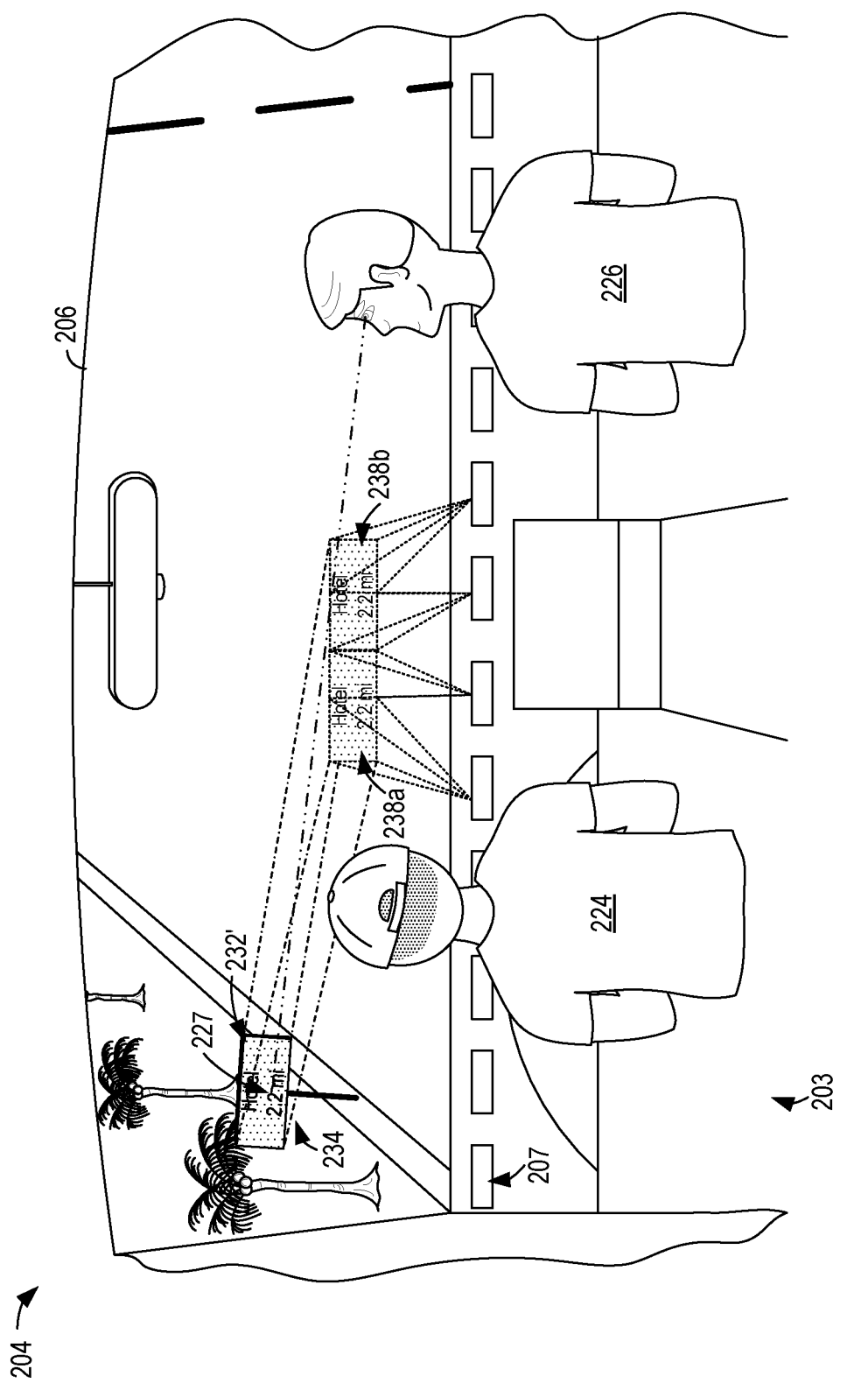

In some examples, the virtual image 232' may be configured to track a position of a real-world object as the real-world object moves in the environment (or as the vehicle moves in relation to the real-world object through the environment). FIG. 2F shows an example of a movement of stereoscopic images 238a/b in order to maintain alignment of the virtual image 232' with the position of the sign 234 as the position of the sign moves relative to the vehicle 204. Accordingly, the relative positioning of the stereoscopic images 238a/b and the sign 234 in FIGS. 2E and 2F may be substantially to scale to show the movement of the sign 234 in the real world and the resulting movement of the stereoscopic images (and resulting virtual image) to maintain alignment with the sign 234 as viewed from the perspective of the second occupant.

Figure 2G:
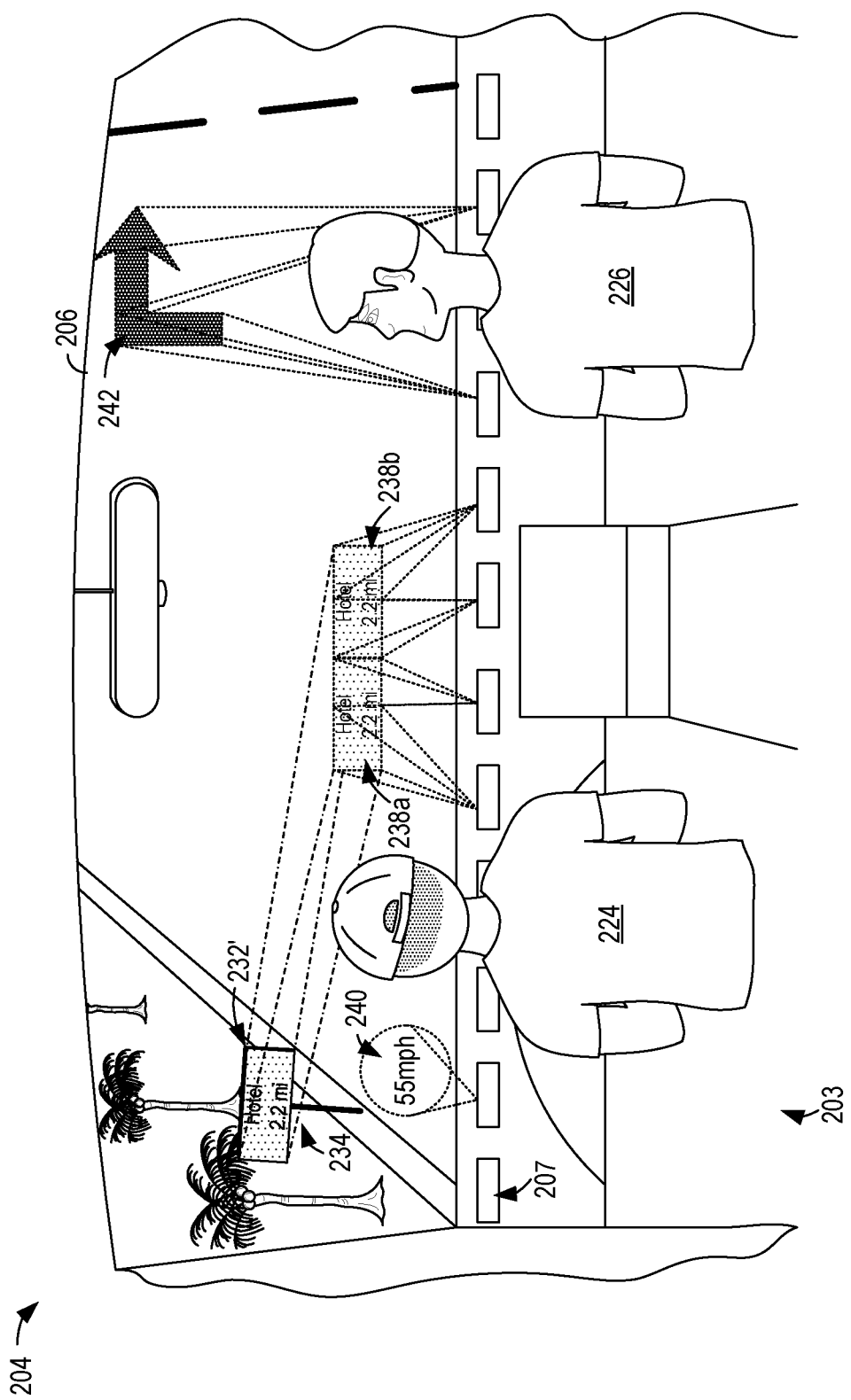

FIG. 2G shows an example scenario in which multiple display units may be used to project multiple images via the windshield 206, enabling a large portion of the windshield 206 (e.g., an entirety of the windshield) to be used as a display surface. For example, in addition to the stereoscope images 238a/b described above with respect to FIG. 2F, another display unit may project a current speed indicator 240 (e.g., a display unit on the left end of the windshield) and still other display units may project a navigation instruction 242 (e.g., display units on the right end of the windshield). The speed indicator 240 and navigation instruction 242 may be displayed in a near-field (e.g., in a different field relative to the virtual image 232'), while the virtual image 232' may be displayed in a far-field. As illustrated, the number of display units used to display a given image may vary. In some examples, the display units used to display various virtual images or indicators on/through the windshield may be greater than the number of virtual images and/or indicators displayed on/through the windshield. In other examples, the same number or fewer display units may be used to display the number of virtual images and/or indicators displayed on/through the windshield. The number of display units used to display a given virtual image or set of virtual images may depend on parameters of the virtual image(s), such as a size, resolution, content, color, etc.

In the illustrated example, the display units 207 are utilized to display the various images via the windshield, however, it is to be understood that the images may be presented using other display arrangements that are disclosed herein. For example, the speed indicator 240 and/or the navigation instruction 240 may be displayed via a see-through display formed by the windshield 206, while the virtual image 232' may be displayed via mirrorless display units 207. In other examples, one or more of the display units 207 may alternatively include other display configurations that are disclosed herein, which may include mirrors in some examples.

Returning to FIG. 2A, the display 208 may be controlled via a display controller 214. The display controller 214 may be a dedicated display controller (e.g., a dedicated electronic control unit that only controls the display) or a combined controller (e.g., a shared electronic control unit that controls the display and one or more other vehicle systems). In some examples, the display controller may be a head unit of the vehicle 204 (e.g., an infotainment unit and/or other in-vehicle computing system). The display controller may include memory and a processor for executing instructions stored in the memory to control an output of the display 208. The display controller 214 may control the display 208 to project particular images based on the instructions stored in memory and/or based on other inputs. The display controller 214 may also control the display 208 to selectively turn off (e.g., dim) portions of backlighting backlighting from the backlight array 209 to conserve power and/or reduce heat based on a state of the display and/or ambient conditions of the display. For example, when regions of an image are black, portions of the backlight array 209 corresponding to the locations of the black regions of the images may be turned off. As another example, if a thermal load is predicted or detected to be above a threshold, selected light sources of the backlight array 209 may be turned off to reduce heat generation (e.g., alternating light sources in the array may be switched off so that the whole image may be displayed while only half of the light sources are generating heat, or the image may be reduced in size and light sources in the array corresponding to locations of newly black regions of the image may be turned off). Examples of inputs to the display controller 214 to control mechanism of display 208 include an eye tracking module 216, a sunload monitoring module 218, a user input interface 220, and a vehicle input interface 222.

Eye tracking module 216 may include and/or be in communication with one or more image sensors to track movement of eyes of a user (e.g., a driver). For example, one or more image sensors may be mounted in a cabin of the vehicle 204 and positioned to capture (e.g., continuously) images of pupils or other eye features of a user in the vehicle. In some examples, the image data from the image sensors tracking the eyes may be sent to the display controller for processing to determine a gaze direction and/or other eye tracking details. In other examples, the eye tracking module 216 may include and/or may be in communication with one or more processing modules (e.g., local modules within the vehicle, such as a processing module of a head unit of the vehicle, and/or remote modules outside of the vehicle, such as a cloud-based server) configured to analyze the captured images of the eyes and determine the gaze direction and/or other eye tracking details. In such examples, a processed result indicating a gaze direction and/or other eye tracking information may be sent to the display controller. The eye tracking information, whether received by or determined at the display controller, may be used by the display controller to control one or more display characteristics. The display characteristics may include a location of display data (e.g., to be within a gaze direction), localized dimming control (e.g., dimming backlighting in regions that are outside of a gaze direction), a content of display data (e.g., using the gaze direction to determine selections on a graphical user interface and rendering content corresponding to the selections on the graphical user interface), and/or other display characteristics. In some examples, other eye tracking data may be used to adjust the display characteristics, such as adjusting a visibility (e.g., opacity, size, etc.) of displayed data responsive to detection of a user squinting.

Sunload monitoring module 218 may include and/or be in communication with one or more sun detection sensors, such as infrared sensors, to determine an amount of sunlight (or other light) impinging on the windshield and/or display elements. As described above with respect to the image sensors and eye tracking data, sunload monitoring data may be processed locally (e.g., by the sunload monitoring module 218, by the display controller 214, and/or by another in-vehicle processing module, such as a processing module of a head unit of the vehicle 204), remotely (e.g., by a remote service outside of the vehicle, such as a cloud-based server), and/or some combination thereof. The sunload monitoring data may include an amount of sunlight (or other light) in a given region of the vehicle that is associated with the display configuration (e.g., display units, regions of the windshield onto which display light from the display 208 may be projected, other locations in a path of light emitted from the display 208, etc.). The amount of light may be compared to one or more thresholds and used by the display controller 214 to adjust one or more display characteristics. For example, if sunload in a particular region of the windshield is above a threshold, the display controller and/or another suitable controller may adjust a physical position of an optical element (e.g., the 3D element 212) to increase a focal length of the display configuration and reduce a magnification of the optics of the display configuration, thereby decreasing a sunload on the display elements (e.g., a thin-film-transistor, TFT, of an LCD display).

The user input interface 220 and vehicle input interface 222 may be used to provide instructions to the display controller 214 to control the display based on user input and vehicle data/status, respectively. For example, user input to change a type of information displayed (e.g., to select between instrument data such as speed/RPM/etc. and navigation data such as turn directions), to select options when a graphical user interface is displayed, and/or to otherwise indicate user preferences may be provided to the display controller 214 and processed to alter a content and/or format of the data displayed via the display configuration 202. The user input interface may receive user input from any suitable user input device, including but not limited to a touch screen, vehicle-mounted actuators (e.g., buttons, switches, knobs, dials, etc.), a microphone (e.g., for voice commands), an external device (e.g., a mobile device of a vehicle occupant), and/or other user input devices. The vehicle input interface 222 may receive data from vehicle sensors and/or systems indicating a vehicle status and/or other vehicle data, which may be sent to the display controller 214 to adjust content and/or format of the data displayed via the display configuration 202. For example, a current speed may be supplied (e.g., via a controller-area network, CAN, bus of the vehicle) to the vehicle input interface and sent to the display controller to update a display of a current speed of the vehicle. The vehicle input interface may also receive input from a navigation module of a head unit of the vehicle and/or other information sources within the vehicle.

Figure 3:
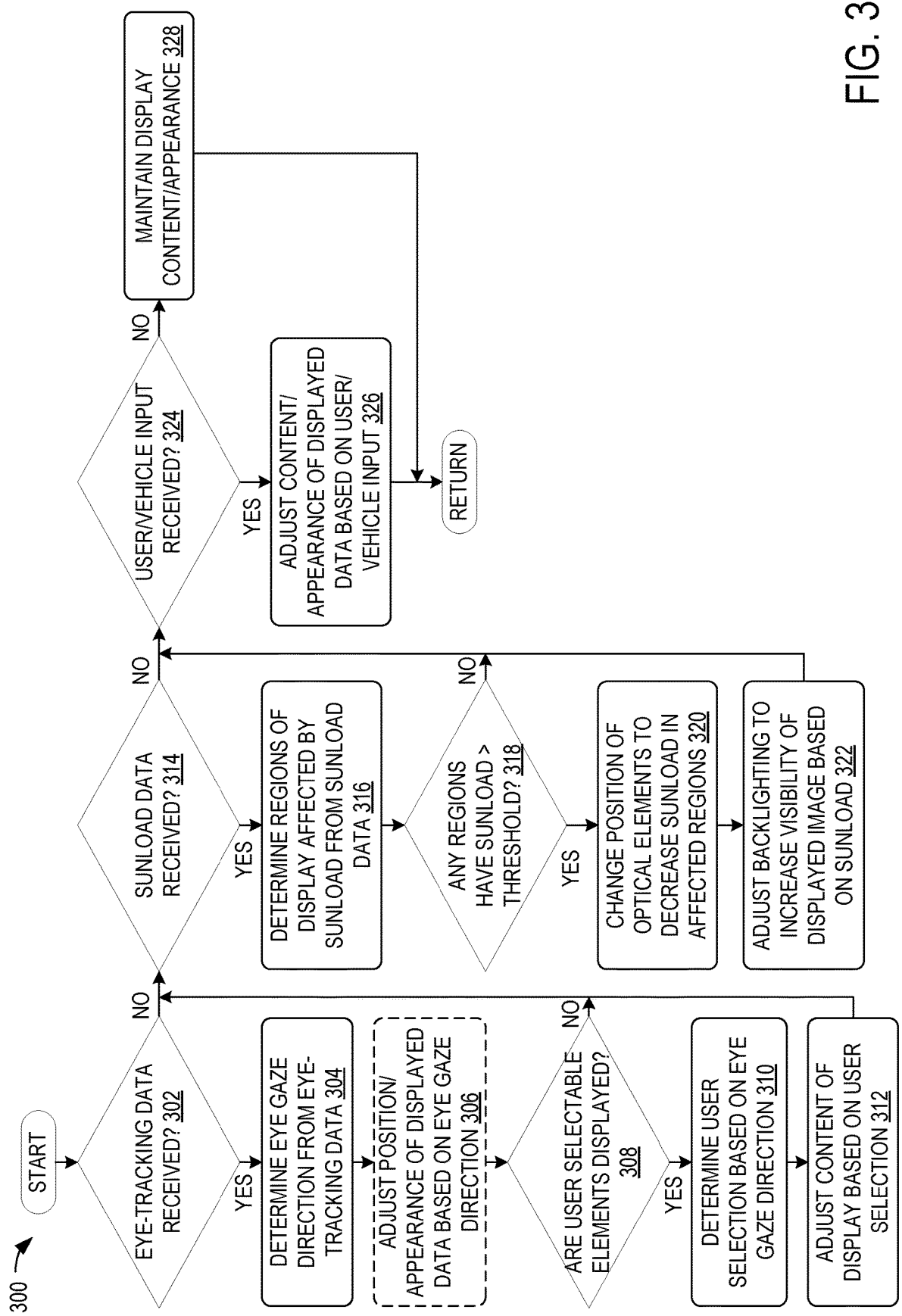
FIG. 3 shows an example flow chart of a method for adjusting a display in accordance with one or more embodiments of the present disclosure.

FIG. 3 is a flow chart of an example method 300 of controlling a display based on eye tracking, sunload, user input, and/or vehicle input. Method 300 may be performed by a display controller, such as display controller 214 of FIG. 2A, in correlation with other devices, such as eye tracking module 216, sunload monitoring module 218, user input interface 220, and vehicle input interface 222 of FIG. 2A. At 302, the method includes determining if eye-tracking data is received. If eye-tracking data is received (e.g., "YES" at 302), the method includes determining an eye gaze direction from the eye-tracking data, as indicated at 304. Optionally, the method further includes adjusting a position and/or appearance of displayed data based on the eye gaze direction, as indicated at 306. For example, a position of displayed data may be adjusted to align with an eye gaze direction (e.g., to be positioned on a new continuous plane that is updated to align with the eye gaze detection). As another example, displayed content may be decreased and/or lightened (e.g., reducing an output of a display) when an eye gaze direction is not aligned with a position of the displayed data (e.g., when a viewer looks away from the displayed data, the displayed data may be decreased to conserve power resources).

At 308, the method includes determining if user selectable elements are displayed. If user selectable elements are displayed (e.g., "YES" at 308), the method includes determining a user selection based on the eye gaze direction, as indicated at 310. For example, the eye gaze direction may be compared to a location of displayed elements in a field of view of the user to determine with which (if any) selectable items the gaze of the user intersects. At 312, the method includes adjusting content of the display based on the user selection. For example, different displayed information may be presented responsive to user input selecting a different view.

Upon adjusting content, or if no user selectable elements are displayed (e.g., "NO" at 308), or if eye-tracking data is not received (e.g., "NO" at 302), the method includes determining whether sunload data is received, as indicated at 314. If sunload data is received (e.g., "YES" at 314), the method includes determining, from the sunload data, regions of the display affected by sunload, as indicated at 316. At 318, the method includes determining if any regions have sunload that is above a threshold. If one or more regions of the display have a sunload that is above the threshold (e.g., "YES" at 318), the method includes changing a position of optical elements to decrease sunload in the affected regions (e.g., the one or more regions with sunload above the threshold), as indicated at 320. At 322, the method includes adjusting a backlighting to increase visibility of the displayed image based on sunload. For example, a brightness or contrast of imagery in the regions with above the threshold amount of sunload may be increased to increase visibility of these regions of the display.

Upon adjusting the display to counteract sunload, or if no regions have a sunload that is above the threshold (e.g., "NO" at 318), or if sunload data is not received (e.g., "NO" at 314), the method includes determining if user or vehicle input is received, as indicated at 324. If user or vehicle input is not received (e.g., "NO" at 324), the method may include maintaining a display content and/or appearance (e.g., not changing the display), as indicated at 328. In some examples, maintaining a display content and/or appearance may include not changing the display at all, whereas in other examples, maintaining a display content and/or appearance may include maintaining a relative positioning and/or appearance of display content. For example, if the displayed content is overlaid over a real-world object and configured to be locked to that object as the object moves through the environment and/or moves relative to the user/vehicle (e.g., as the user/vehicle moves through the environment relative to the object), maintaining the display content and/or appearance may include maintaining the positioning of the display content to be aligned with the real-world object (which may include moving the position of the display content on the display medium, such as the windshield of the vehicle).

If user or vehicle input is received (e.g., "YES" at 324), the method includes adjusting content and/or appearance of displayed data based on the user and/or vehicle input, as indicated at 326. For example, the displayed data may be adjusted to register a user input selecting a menu option (e.g., as described above at 312) and/or to satisfy a user preference (e.g., where the user may specify an increase in display size, or another change in display appearance, or where the user may specify a different display mode, a display shut down, etc.). The user input may be received as voice input (e.g., detected by a microphone associated with the vehicle), touch input (e.g., detected by a touch sensor associated with the vehicle), actuated input (e.g., detected by one or more buttons/actuators associated with the vehicle), eye gaze input (e.g., detected by one or more eye gaze sensors associated with the vehicle), and/or any other user input mechanism.

As another example, the displayed data may be adjusted to output an updated vehicle parameter (e.g., a vehicle speed, engine RPM, etc.) responsive to data from the vehicle indicating the vehicle parameter. The user/vehicle input may also include a user/vehicle status that reflects a user workload or environmental condition that is used to change a parameter of the displayed data. For example, responsive to indications from a user (e.g., stress detection) and/or from the vehicle (e.g., obstacle detection, increased traffic, difficult navigation maneuvers, inclement weather conditions, etc.), the displayed data may be adjusted to assist the user in concentrating on driving tasks (e.g., the displayed data may be reduced in size/brightness, the displayed data may be moved to a less prominent location such as a far side of the windshield, the displayed data may be temporarily turned off, etc.). Likewise, after determining that driving conditions and/or user status has returned to a state in which a heads up display may not be distracting (e.g., reduced traffic, disappearance of obstacle, passing difficult navigation maneuvers, clearing weather, etc.), the displayed data may be returned to a previous location and/or appearance, and/or may be turned back on.

Figure 4:
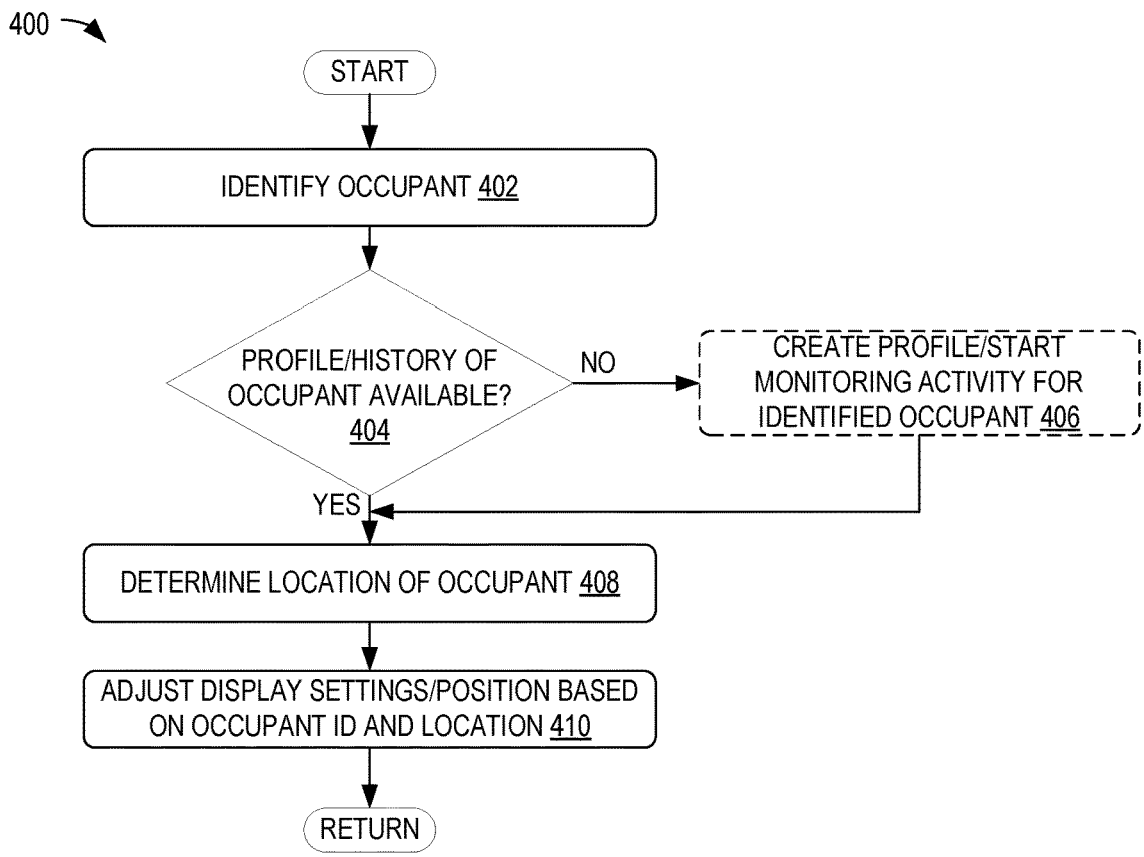
FIG. 4 shows an example flow chart of a method for adjusting a display based on occupant monitoring in accordance with one or more embodiments of the present disclosure.

User/vehicle input may include occupant monitoring, such that information from vehicle systems may be used to control display personalization based on an occupant. FIG. 4 shows an example method 400 for adjusting a display based on occupant monitoring. For example, method 400 may be performed in order to provide the adjustments at 326 of method 300. Method 400 may be performed by an in-vehicle computing system, which may include a display controller, such as display controller 214 of FIG. 2.

At 402, the method includes identifying an occupant. The occupant may be identified on a visual basis (e.g., based on feature detection, such as face detection, eye scanning, fingerprint scanning, and/or other biometric scanning, using cameras/detectors in the vehicle cabin and/or cameras/detectors accessible to the vehicle, such as a camera/detector of a mobile device in communication with the vehicle). The occupant may additionally be identified using communicated authentication information (e.g., a signal from a radiofrequency chip carried by or implanted in the occupant, a signal from a mobile device or other authenticated device of the occupant, etc.).

At 404, the method includes determining whether a profile or personalized history for the occupant is available (e.g., stored in memory local to and/or accessible by the in-vehicle computing system). An occupant profile and/or personalized history may include information regarding an occupant's historical interaction with the in-vehicle computing system and/or other computing systems, as well as stored preferences regarding display settings (e.g., display appearance preferences, user interface preferences, display content preferences, etc.), which may be learned via occupant monitoring (e.g., identifying display usage patterns of the occupant and/or identifying reactions of the occupant to different display configurations) and/or input directly from the occupant. The occupant profile and/or personalized history may be stored in the memory and associated with an occupant ID. If a profile and/or personalized history of the occupant is not available (e.g., "NO" at 404), the method optionally proceeds to create a profile and/or start monitoring activity for the identified occupant, as indicated at 406. For example, the in-vehicle computing system may register an occupant ID for the occupant, associated with one or more identifiable characteristics of the occupant (e.g., the information obtained to identify the occupant at 402), and begin collecting data regarding occupant usage of the in-vehicle computing system/display and associate the collected data with the registered ID.

If a profile and/or personalized history of the occupant is available (e.g., "YES" at 404) and/or once a profile/history is started for the occupant, the method includes determining a location of the occupant, as indicated at 408. For example, the in-vehicle computing system may receive information from one or more sensors of the vehicle (or in communication with the vehicle) to determine the location of the occupant (e.g., using visual tracking of the occupant, audio tracking of a voice of the occupant, etc.). At 410, the method includes adjusting the display settings and/or position of display elements based on the occupant ID (e.g., based on the profile/history of the occupant) and based on the location of the occupant. For example, the location of displayed information may be targeted to be a line of sight of the occupant and/or to be in a location associated with a location of the occupant (e.g., if the occupant is in a right passenger seat, the display may be positioned in a location that is best viewed from that position of the cabin, such as a right side of the windshield). The position of the displayed content may include any position in the continuous plane created by the display system, such that display content for multiple occupants may occupy different depths, horizontal, and/or vertical positions from one another. For example, displayed data targeting occupants in a rear of the vehicle may be positioned in a nearer field of view than displayed data targeted occupants in a front of the vehicle in order to represent the relative location of the users to one another. Furthermore, displayed content for each occupant may be targeted to align with the focus of the respective occupant's eyes. The display settings adjusted at 410 may also include an appearance of the displayed content (e.g., size, color, transparency, style/font, arrangement, etc.), a persistence of the content (e.g., how long content is maintained as being displayed), and/or the actual content (e.g., what content is displayed responsive to a given input and/or user/vehicle status).

Figure 5:
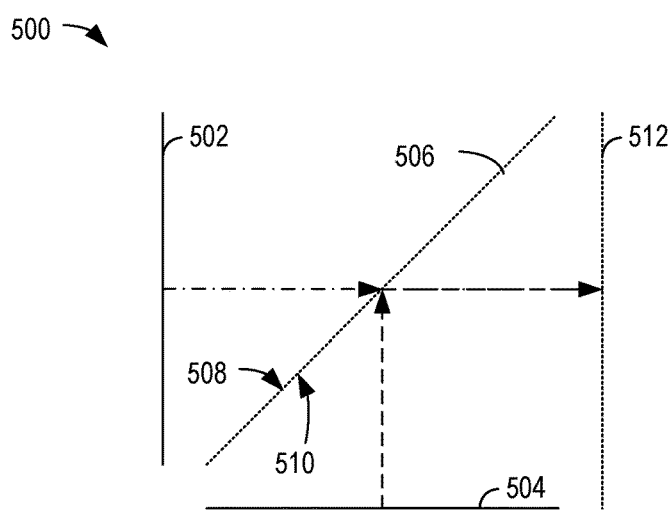
FIG. 5 shows an example multi-plane display configuration in accordance with one or more embodiments of the present disclosure.

The disclosure also provides for displaying information using multiple plane projections, such as multiple two-dimensional overlapping planes in space. For example, two different image generation devices may be embedded in a vehicle or other environment to provide a heads up display that overlays image information at different distances. FIG. 5 shows an example display configuration 500 in which a first display 502 may be used to provide a first, near-field image and a second display 504 may be used to provide a second, far-field image (or vice versa). The first and second display may each include LCD transmissive displays in some examples. In the illustrated example, the first and second displays are positioned at approximately 90 degrees relative to one another. The first and second displays may be positioned to enable polarized light at specific angles to enable reflection at Brewster's angles. Each of the first display 502 and the second display 504 may transmit light toward a mirror 506, which may be configured to transmit light arriving at a first surface (e.g., a first display-side surface 508) and to reflect light arriving at a second surface (e.g., a second display-side surface 510). In this way, light from each of the first and second displays may be directed toward a light adjusting element 512, which may include a waveplate (e.g., a quarter waveplate) or a retardation film (e.g., to allow for viewing through sunglasses by compensating for polarization provided by the sunglasses). The light adjusting element 512 and/or one or more other optical elements (e.g., a lens system) may be used to shift planes of the light from the first and second displays, respectively, such that light from the first display appears in a near-field and light from the second display appears in a far field (e.g., a farther field than the near-field).

In some additional or alternative examples, multiple planes may be created by using chromatic films that perform dense spectral combining to create multiple images by allowing certain light to pass through while reflecting others, thereby allowing overlapping imagery in three-dimensional space. As another example, a display configuration may include lasers that create multiple holographic sheets to produce the multiple image plane effect.

As another example, multiple near and far plane projections may be created using a transparent organic light emitting diode (OLED) as windshield glass (e.g., windshield 206 of FIG. 2A) or embedding a photo-sensitive material in windshield glass to produce a near-plane image and using LCD or MEMS-based projection (e.g., using any of the above-described projection examples) to produce a far-plane image. The above example constructions allow for multiple image planes to be produced without using high volume and/or high profile projection systems. Furthermore, the above example constructions have reduced power consumption relative to other constructions.

In the above-described examples of producing images in multiple planes, associated displays may be controlled to produce different images that benefit from the different plane distances. For example, near-plane images may be controlled to be images that benefit from increased sharpness and stability, such as images that are able to remain in a relatively static position relative to the viewer/vehicle, even as the environment moves. As a detailed example, near-plane images may include vehicle status information and/or instrument panel type display data, such as a vehicle speed, vehicle warnings/alerts (e.g., oil level, temperature, maintenance reminders, diagnostic code warnings, etc.), engine RPM, tachometer information, remaining fuel level/estimated distance that can be traveled on the remaining fuel, notifications (e.g., from a connected mobile device, such as incoming communications), current time, radio/audio information (e.g., current radio station, currently-played song, etc.), graphical user interface controls, and/or other display elements. Far-plane images may be controlled to be images that benefit from interaction with the surrounding environment (e.g., images that are world-locked, or maintain a same position relative to the surrounding environment to augment the surrounding environment). For example, far-plane images may include navigation directions (e.g., which may be overlaid on a road surface, road sign, other vehicle, etc. and move relative to a viewer to maintain a static relationship with the environmental feature over which the display data is laid), informational displays identifying or providing status information for environmental features, and/or other displayed data. The above-described near- and far-plane images may be produced in different continuous planes, such that the images in the near-plane occupy a first, closer range of depths and the images in the far-plane occupy a second, farther range of depths. As a non-limiting example, images in the near-plane may be positioned to appear to a user to be within a range of 5 meters to 25 meters away from the user, and images in the far-plane may be positioned to appear to the user to be within a range of 26 meters to 75 meters away from the user.

Figure 6:
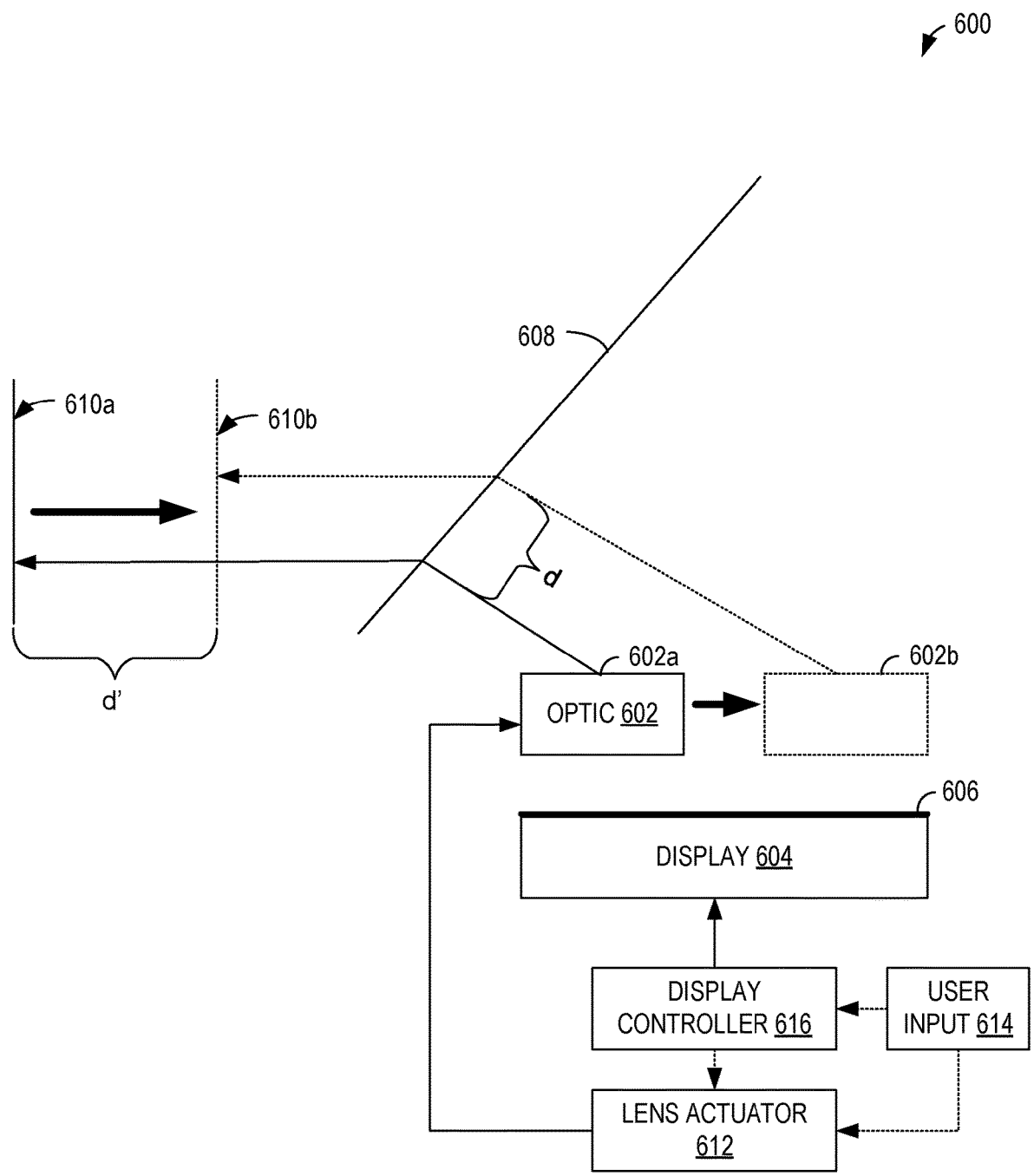
FIG. 6 shows an example display configuration with adjustable optics in accordance with one or more embodiments of the present disclosure.

FIG. 6 shows an example display configuration 600 including a movable optic 602 that is moveable to adjust a position or depth of field of displayed data. The configuration of FIG. 6 is similar to the configuration of FIG. 2A, however it is to be understood that the movable optic 602 may be incorporated into any suitable display configuration, including the other configurations disclosed herein. Display configuration 600 includes a display 604, which may be an LCD, DLP MEMS, or other display technology. The display 604 may be covered with and/or may direct light through a 3D element 606, such as a lenticular lens or parallax barrier to produce a three-dimensional image that is passed through the movable optic 602. The movable optic 602 may include an adjustable lens or array of lenses (e.g., zoom optics) that is positioned over the display (and over the 3D element). As shown, when the movable optic 602 is in position 602*a*, image light from the display 604 may be transmitted through a windshield 608 to produce an image at a first depth of field indicated at 610*a*. Responsive to moving the movable optic to position 602*b*, image light from the display 604 may be transmitted through the windshield 608 to produce the image at a second depth of field indicated at 610*b*. Accordingly, responsive to moving the movable optic in space, which results in the change of distance or angle of the light impinging on the windshield as indicated at d, the depth of field of the displayed image may be adjusted to be nearer or farther from the windshield/viewer, the change of distance of the depth of field being shown at d'.

The movable optic may be controlled via a lens actuator 612 responsive to user input from a user input device 614 and/or responsive to instructions from a display controller 616 (which may also be controlled at least in part by user input from user input device 614). The display controller 616 may control an output of the display 604 (e.g., as described above with respect to the display controller 214 of FIG. 2A). The lens actuator 612 may include one or more components to physically move the movable optic 602 to change a physical location of the movable optic within the display configuration. Although FIG. 6 shows a lateral movement (e.g., maintaining a same distance from the display, and changing a lateral position relative to the display) in the illustrated example, it is to be understood that the movable optic 602 may be moved in any suitable manner, including movements along a direction of light emitted from the display (e.g., changing a distance between the optic and the display) and changes in orientation of the optic relative to the display.

In any of the above examples of display systems/configurations, multiple displays may be used to output image light for generating a three-dimensional image. The multiple displays may include one or more arrays of one or more displays. The displays and/or arrays may include displays having different strengths or characteristics in some examples. For example, the display systems may include at least one organic light-emitting diode (OLED) display and at least one liquid crystal display (LCD) in order to take advantages of the relative strengths of the displays. The OLED display(s) may be primarily enabled (e.g., instead of LCD displays) during low ambient light conditions and/or conditions where a high contrast ratio is desired. The LCD display(s) may be primarily enabled (e.g., instead of OLED displays) during high ambient light conditions and/or conditions where a high level of brightness is desired. As a detailed, non-limiting example, only the LCD displays in a display system may be enabled or more LCD displays than other displays in the display system may be enabled when the display system detects above a threshold amount of ambient light (e.g., above 500 nits). When the display system detects below the threshold amount of ambient light, only the OLED displays in the display system may be enabled or more OLED displays than other displays in the display system may be enabled. In some examples, different displays may be enabled or disabled by controlling backlighting that is supplied to the displays (e.g., by turning off portions of a matrix of backlight light sources that correspond to displays selected to be disabled and/or turning on portions of the matrix of backlight light sources that correspond to displays selected to be enabled).

The above-described examples include display configurations that include one or more features to have the technical effect of decreasing a packaging size (e.g., by providing a mirrorless three-dimensional display configuration), decreasing a power consumption (e.g., by selectively dimming backlighting), decreasing a thermal load (e.g., by controlling the spacing of components and reducing backlighting), and/or increasing a user experience (e.g., increasing user comfort by adjusting a depth of field of displayed images) relative to other display configurations. In some examples, output images may be transformed relative to images output by other display configurations to better integrate with an environment (e.g., using continuous plane displays or projections) and/or to improve image quality (e.g., adjusting a radius of portions of a lenticular lens). Furthermore, the use of micro lens arrays to transform a windshield or other large transparent plane into a display surface as described above enables a field of view of a resulting display to be increased without affecting image fidelity.

The disclosure provides for a method of operating a display system, the method including adjusting an output of image light from a display to pass through an optical element positioned between the display and at least one micro lens array, including impinging light upon a transparent plane to generate a three-dimensional image on a continuous plane that is based on a user focal point and/or origin position of an eye gaze determined by an eye-tracking module. In a first example, the method may additionally or alternatively further comprise dynamically changing a position of the associated three-dimensional image on the continuous plane as an environment of a user having the user focal point moves. A second example optionally includes the first example, and further includes the method further comprising dynamically changing the position of the three-dimensional image and/or the continuous plane based as the user focal point moves. A third example optionally includes one or both of the first example and the second example, and further includes the method further comprising receiving occupant monitoring data from one or more occupant monitoring sensors and controlling an output of the image light based on the occupant monitoring data. A fourth example optionally includes one or more of the first through the third examples, and further includes the method, wherein the occupant monitoring data includes an occupant identifier and/or an occupant location, the occupant identifier being associated with an occupant profile and/or personalized occupant history of an occupant associated with the occupant identifier. A fifth example optionally includes one or more of the first through the fourth examples, and further includes the method, wherein the associated three-dimensional image has a position on the continuous plane that is based on the occupant location and an appearance and/or content that is based on the occupant profile and/or personalized occupant history of the occupant associated with the occupant identifier. A sixth example optionally includes one or more of the first through the fifth examples, and further includes the method, wherein the personalized occupant history of the occupant includes historical interactions of the occupant with the display system.

The disclosure also provides for a display system for providing a three-dimensional augmented reality experience, the display system including a display, at least one micro lens array, an optical element positioned between the display and the at least one micro lens array, an eye-tracking module configured to receive eye-tracking data from an eye-tracking sensor indicating a user focal point, and a display controller comprising a processor and memory, the memory storing instructions executable by the processor to control an output of image light from the display to pass through the optical element and the at least one micro lens array and impinge upon a transparent plane to generate a three-dimensional image on a continuous plane that is based on the user focal point. In a first example, the optical element is additionally or alternatively configured to split each pixel of a selected image to create a left eye image and a right eye image, the left eye image and the right eye image forming the generated three-dimensional image. A second example optionally includes the first example, and further includes the display system, further comprising an occupant monitoring module configured to receive occupant monitoring data from one or more occupant monitoring sensors. A third example optionally includes one or both of the first example and the second example, and further includes the display system, wherein the instructions are further executable by the processor to control an output of the image light based on the occupant monitoring data. A fourth example optionally includes one or more of the first through the third examples, and further includes the display system, wherein the occupant monitoring data includes an occupant identifier and/or an occupant location, the occupant identifier being associated with an occupant profile and/or personalized occupant history of an occupant associated with the occupant identifier. A fifth example optionally includes one or more of the first through the fourth examples, and further includes the display system, wherein the generated three-dimensional image has a position on the continuous plane that is based on the occupant location and an appearance and/or content that is based on the occupant profile and/or personalized occupant history of the occupant associated with the occupant identifier. A sixth example optionally includes one or more of the first through the fifth examples, and further includes the display system, wherein the display system is included in a vehicle, and wherein the transparent plane is a windshield of the vehicle. A seventh example optionally includes one or more of the first through the sixth examples, and further includes the display system, wherein the three-dimensional image is controlled by the display controller to be positioned at different depths in the continuous plane as the vehicle moves through an environment. An eighth example optionally includes one or more of the first through the seventh examples, and further includes the display system, wherein the three-dimensional image is controlled by the display controller to be positioned at different depths in the continuous plane as the user focal point changes. A ninth example optionally includes one or more of the first through the eighth examples, and further includes the display system, wherein the optical element is a lenticular lens or parallax barrier.

The disclosure also provides for a display system for a vehicle, the display system including a display, at least one micro lens array, an optical element positioned between the display and the at least one micro lens array, an eye-tracking module configured to receive eye-tracking data from an eye-tracking sensor indicating a user focal point, an occupant monitoring module configured to receive occupant monitoring data from one or more occupant monitoring sensors, and a display controller comprising a processor and memory, the memory storing instructions executable by the processor to control an output of image light from the display to pass through the optical element and the at least one micro lens array and impinge upon a windshield of the vehicle to generate a heads-up display image for the vehicle, the heads-up display image including a three-dimensional image positioned at a selected depth on a continuous plane that is created at the user focal point, the selected depth being selected based on the eye-tracking data and/or the occupant monitoring data. In a first example, the occupant monitoring data may additionally or alternatively include an occupant identifier and/or an occupant location, the occupant identifier being associated with an occupant profile and/or personalized occupant history of an occupant associated with the occupant identifier. A second example optionally includes the first example, and further includes the display system, wherein the selected depth on the continuous plane on which the three-dimensional image is positioned is dynamically changed as a function of movement of the vehicle through an environment.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the display controller 214 described with reference to FIG. 2A. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method of operating a display system, the method comprising:
adjusting an output of image light from a display to pass through an optical element positioned between the display and at least one micro lens array, including impinging light upon a transparent plane to generate a three-dimensional image on a continuous plane that is based on a user focal point and/or origin position of an eye gaze determined by an eye-tracking module; and
further adjusting the display system based on a measured sunlight intensity detected by a sunload monitoring module, wherein the sunload monitoring module includes or is in communication with one or more sun detection sensors, and wherein the adjusting of the display system includes adjusting a physical position of the optical element to decrease a sunload in one or more regions of the display in response to the one or more sun detection sensors measuring sunlight intensity above a threshold in the one or more regions of the display;
wherein adjusting of the physical position of the optical element comprises reducing a magnification and increasing a focal length of the display system; and
wherein the one or more sun detection sensors are infrared sensors.

2. The method of claim 1, further comprising dynamically changing a position of the associated three-dimensional image on the continuous plane as an environment of a user having the user focal point moves.

3. The method of claim 1, further comprising dynamically changing the position of the three-dimensional image and/or the continuous plane as the user focal point moves.

4. The method of claim 1, further comprising receiving occupant monitoring data from one or more occupant monitoring sensors and controlling an output of the image light based on the occupant monitoring data.

5. The method of claim 4, wherein the occupant monitoring data includes an occupant identifier and/or an occupant location, the occupant identifier being associated with an occupant profile and/or personalized occupant history of an occupant associated with the occupant identifier.

6. The method of claim 5, wherein the associated three-dimensional image has a position on the continuous plane that is based on the occupant location and an appearance and/or content that is based on the occupant profile and/or personalized occupant history of the occupant associated with the occupant identifier.

7. The method of claim 5, wherein the personalized occupant history of the occupant includes historical interactions of the occupant with the display system.

8. A display system for providing a three-dimensional augmented reality experience, the display system comprising:
a plurality of display units, wherein each display unit comprises:
a display;
at least one micro lens array; and
an optical element positioned between the display and the at least one micro lens array;
an eye-tracking module configured to receive eye-tracking data from an eye-tracking sensor indicating a user focal point of a first occupant;
a sunload monitoring module configured to include or be in communication with one or more sun detection sensors to measure sunlight intensity; and
a display controller comprising a processor and memory, the memory storing instructions executable by the processor to:
control, for each display unit, an output of image light from the display to pass through the optical element and the at least one micro lens array and impinge upon a transparent plane to generate a first three-dimensional image on a continuous plane that is based on the user focal point of the first occupant and a second three-dimensional image on the continuous plane that is based on a second user focal point of a second occupant; and
adjust the display system based on the measured sunlight intensity detected by the sunload monitoring module;
wherein a first group of display units of the plurality of display units generates the first three-dimensional image, and a second group of display units of the plurality of display units generates the second three-dimensional image;
wherein the first three-dimensional image and the second three-dimensional image have an appearance and/or content that is based on an occupant profile and/or personalized occupant history of the first occupant and the second occupant, respectively.

9. The display system of claim 8, wherein the optical element is configured to split each pixel of a selected image to create a left eye image and a right eye image, the left eye image and the right eye image forming the generated three-dimensional image.

10. The display system of claim 8, further comprising an occupant monitoring module configured to receive occupant monitoring data from one or more occupant monitoring sensors.

11. The display system of claim 10, wherein the instructions are further executable by the processor to control an output of the image light based on the occupant monitoring data.

12. The display system of claim 11, wherein the first occupant and the second occupant are each associated with an occupant identifier, wherein the occupant monitoring data includes the occupant identifier and/or an occupant location for each of the first occupant and the second occupant, the occupant identifier of the first occupant and the second occupant being associated with the occupant profile and/or personalized occupant history of the first occupant and the second occupant, respectively;
wherein the first three-dimensional image has a position on the continuous plane that is based on the occupant location of the first occupant;
wherein the second three-dimensional image has a position on the continuous plane that is based on the occupant location of the second occupant;
wherein the first three-dimensional image is different from the second three-dimensional image; and
wherein the adjusting of the display system includes adjusting a position of the optical element to reduce a sunload on the display.

13. The display system of claim 8, wherein the display system is included in a vehicle, and wherein the transparent plane is a windshield of the vehicle.

14. The display system of claim 13, wherein the three-dimensional image is controlled by the display controller to be positioned at different depths in the continuous plane as the vehicle moves through an environment.

15. The display system of claim 13, wherein the three-dimensional image is controlled by the display controller to be positioned at different depths in the continuous plane as the user focal point changes.

16. The display system of claim 8, wherein the optical element is a lenticular lens or parallax barrier and wherein the display system further comprises a backlight for the display comprising a matrix of light-emitting diodes.

17. A display system for a vehicle, the display system comprising:
a plurality of display units, each display unit of the plurality of display units comprising:
a display;
at least one micro lens array; and
an optical element positioned between the display and the at least one micro lens array;
an eye-tracking module configured to receive eye-tracking data from an eye-tracking sensor indicating a user focal point;
an occupant monitoring module configured to receive occupant monitoring data from one or more occupant monitoring sensors;
a sunload monitoring module configured to include or be in communication with one or more sun detection sensors to measure sunlight intensity; and
a display controller comprising a processor and memory, the memory storing instructions executable by the processor to:
control, for each display unit of the plurality of display units, an output of image light from the display to pass through the optical element and the at least one micro lens array and impinge upon a windshield of the vehicle to generate a heads-up display image for the vehicle, the heads-up display image including a first image, a second image, and a three-dimensional image positioned at a selected depth on a continuous plane that is created at the user focal point, the selected depth being selected based on the eye-tracking data and/or the occupant monitoring data; and
adjust the display system based on the measured sunlight intensity detected by the sunload monitoring module,
wherein the adjustment of the display system includes an adjustment of a physical position of the optical element to decrease a sunload in one or more regions of the display, and
wherein the first image and the second image are displayed in a different field relative to the three-dimensional image.

18. The display system of claim 17, wherein the occupant monitoring data includes an occupant identifier and/or an occupant location, the occupant identifier being associated with an occupant profile and/or personalized occupant history of an occupant associated with the occupant identifier.

19. The display system of claim 17, wherein the selected depth on the continuous plane on which the three-dimensional image is positioned is dynamically changed as a function of movement of the vehicle through an environment.

20. The display system of claim 17, wherein the first image is a current speed indicator and the second image is a navigation instruction.

* * * * *